United States Patent
Nishihira et al.

(10) Patent No.: US 6,466,826 B1
(45) Date of Patent: Oct. 15, 2002

(54) APPARATUS AND METHOD FOR PROVIDING BYPASS FUNCTIONS FOR A MOTION SENSOR SWITCH

(75) Inventors: Thomas S. Nishihira, Newark; David A. Blau, Cupertino, both of CA (US)

(73) Assignee: Hubbell Incorporated, Orange, CT (US)

( * ) Notice: Subject to any disclaimer, the term of this patent is extended or adjusted under 35 U.S.C. 154(b) by 0 days.

(21) Appl. No.: 09/340,150

(22) Filed: Jun. 28, 1999

(51) Int. Cl.[7] .................. G05B 11/01; G05B 15/00; H05B 41/36
(52) U.S. Cl. ............... 700/17; 700/12; 700/14; 700/82; 315/157; 315/158
(58) Field of Search ................ 700/12, 14, 17, 700/83; 315/154, 159, 157, 158; 340/545.3, 565, 567; 361/179

(56) References Cited

U.S. PATENT DOCUMENTS

| | | | |
|---|---|---|---|
| 4,874,962 A | 10/1989 | Hermans | 307/116 |
| 4,996,515 A | * 2/1991 | Schaffer et al. | 340/426 |
| 5,189,393 A | * 2/1993 | Hu | 340/522 |
| 5,220,250 A | 6/1993 | Szuba | 315/307 |
| 5,293,097 A | * 3/1994 | Elwell | 315/154 |
| 5,619,185 A | 4/1997 | Ferraro | |
| 5,650,773 A | * 7/1997 | Chiarello | 340/691.8 |
| 5,699,243 A | 12/1997 | Eckel et al. | 364/140 |
| 5,763,872 A | 6/1998 | Ness | |
| 5,777,837 A | 7/1998 | Eckel et al. | |
| 5,821,642 A | 10/1998 | Nishihira et al. | 307/127 |
| 5,856,905 A | 1/1999 | Eckel et al. | |
| 5,867,099 A | 2/1999 | Keeter | |
| 5,946,209 A | 8/1999 | Eckel et al. | |
| 5,971,597 A | 10/1999 | Baldwin et al. | |
| 5,984,513 A | 11/1999 | Baldwin | |

\* cited by examiner

*Primary Examiner*—Leo Picard
*Assistant Examiner*—Ryan A. Jarrett
(74) *Attorney, Agent, or Firm*—Christian C. Michel; Stacey J. Longanecker; Joseph J. Buczynski (57) ABSTRACT

An apparatus and method for controlling a motion sensor switch which is adapted to control a lighting circuit in an area monitored by the motion sensor switch. The apparatus and method employs a setting adjustment device, such as a potentiometer, having a setting range which sets the duration of a delay period during which the motion sensor switch delays deactivating the lighting circuit after sensing that the monitored area has become vacant. The setting adjustment device further includes a first setting position, a second setting position, or both. The apparatus and method further employs a bypass controller, such as a comparator circuit or software-implemented comparator, which, when the setting adjustment device is set to the first or second bypass setting position, controls the motion sensor switch to maintain the lighting circuit activated or deactivated, regardless of whether the motion sensor senses motion in the monitored area.

20 Claims, 6 Drawing Sheets

| FIG. 3A | FIG. 3B | FIG. 3C |

APPARATUS AND METHOD FOR PROVIDING BYPASS FUNCTIONS FOR A MOTION SENSOR SWITCH

CROSS-REFERENCE TO RELATED APPLICATIONS

Related subject matter is disclosed in a copending U.S. patent application of Thomas S. Nishihira and David A. Blau entitled "Apparatus and Method for Limiting Leakage to Ground Current While Optimzing Output of a Power Supply Adaptable for Use with a Motion Sensor Switch" (Ser. No. 09/340,112, and in a copending U.S. patent application of Thomas S. Nishihira and David A. Blau entitled "Bi-Color Indicator Lamp for Room Occupancy Sensor" (Ser. No. 09/340,113), both filed even date herewith, and the entire contents of each being incorporated herein by reference.

BACKGROUND OF THE INVENTION

1. Field of the Invention

The present invention relates to an apparatus and method for providing bypass on and off functionality for a motion sensor switch, such as a passive infrared detector adaptable for use with a lighting circuit. More particularly, the present invention relates to an apparatus and method for using the time delay adjustment device or another adjustment device of a motion sensor switch to set a desired output of the motion sensor switch, independent of detection or non-detection of motion by the motion sensor switch, to activate or deactivate a lighting circuit controlled by the motion detector switch, for example.

2. Description of the Related Art

A motion sensor switch, such as a Model 1WS-ZP-M motion sensor switch manufactured by Hubbell, Inc., includes a motion sensor, such as a passive infrared detector (PIR), and an ambient light level sensor, such as a photocell. Other motion sensor switches are described in U.S. Pat. No. 5,821,642 to Nishihira et al., U.S. Pat. No. 5,699,243 to Eckel et al., and U.S. Pat. No. 4,874,962 to Hermans, the entire contents of each being incorporated herein by reference. Motion sensor switches of this type can be used, for example, as an occupancy detector which shuts off lights in a room when the sensor detects that no one is present in the room, and turns on the lights in the room when a person enters the room. A motion sensor switch also can be used, for example, as a motion sensor for an alarm system.

During operation, the motion sensor of the motion sensor switch monitors an area, such as an office, conference room in a building, or a home, for the presence of movement. Specifically, the motion sensor detects a change in the infrared energy radiating from regions in the area monitored by different sensing lobes of the PIR detector, which generally have a pass band within the 8–14 μm infrared range. If a person enters the monitored area, the person changes the amount of infrared energy being detected by the PIR detector. Therefore, the magnitude of the signal output by PIR detector, which is representative of the amount of detected infrared energy, will change. A motion sensor circuit in the motion sensor switch processes this signal, and provides a signal to a controller indicating that the amount of infrared energy received by the infrared detector has changed .

The controller interprets the signal provided by the motion sensor circuit, along with the signal provided by ambient light level sensor, to determine whether the lights in the monitored area should be activated. If the signal provided by ambient light level sensor indicates that the ambient light in the monitored area is low (e.g., very little natural light is present in the monitored area), the control circuit will turn on the lights in the monitored area. However, if the signal provided by ambient light level sensor indicates that the ambient light in the monitored area is sufficient (e.g., due to sunlight, etc.), the control circuit will not turn on the lights. In either event, control of the lights is based on the signals provided by the motion sensor and ambient light level sensor.

Motion sensor switches of this type also typically include a delay timing adjustment device, such as a potentiometer, which can be manually adjusted to set the delay time during which the lights will remain on after all occupants have left the monitored area. For example, if the delay timing adjustment device is adjusted to a 30-second setting, when all occupants leave and remain out of the monitored area for a period of time exceeding 30 seconds, the circuit of the motion sensor turns off the lights in the monitored area to conserve energy.

These motion sensor switches are disadvantageous because they are not capable of maintaining the lights in an active or inactive state regardless of the state of the motion sensor and ambient light level sensor. In other words, the motion sensor switches are incapable of bypassing their normal operation to maintain the lights in an "off" or "on" state as desired. The ambient light level sensor is used to select a minimum level of light above which a lighting fixture is prevented from being switched and powered on following detected motion. A lighting control system operates in a daylight inhibit mode when the ambient light level is sufficient to render the switching of the lighting circuit unnecessary. Setting the ambient light level for daylight inhibit mode can be difficult if lighting circuits are switched on during the level setting process. The operation of the lighting fixtures during this process changes the detected amount of ambient light level to a higher foot-candle level than desired.

Therefore, in typical lighting circuit configurations, it is necessary to provide an "on/off" switch in addition to the motion sensor switch to enable a user to bypass the operation of the motion sensor switch if desired. The on/off switch is separate and distinct from the motion sensor switch, and thus requires additional wiring to connect to the lighting circuit. Also, the setting of the on/off switch is generally different than that of the delay timing adjustment device of the motion sensor switch. Hence, to set the on/off switch, an operator usually needs to use a tool different from that which he or she would use to adjust the delay timing adjustment device. An operator can be further inconvenienced if the on/off switch is not positioned near the motion sensor switch.

Accordingly, a continuing need exists for a motion sensor switch having delay timing functions, as well as the capability of bypassing normal operation to maintain itself in an on or off condition, as desired, regardless of the detected conditions.

SUMMARY OF THE INVENTION

An object of the present invention is to provide a motion sensor switch, adapted for controlling activation and deactivation of a lighting circuit based on detected conditions, and having delay timing functions as well as bypass functions to maintain the lighting circuit in an on or off condition, as desired, regardless of detected conditions.

Another object of the invention is to provide a motion sensor switch, adapted for controlling activation and deactivation of a lighting circuit based on detected conditions, and having a delay timing adjustment device or other type of adjustment device which also functions as a bypass switch to control the motion sensor switch to maintain the lighting circuit in an on or off condition as desired.

A further object of the invention is to provide a delay timing and bypass switch, adapted for use with a motion sensor switch, to control the motion sensor switch to delay switching from a first output condition to a second output condition after the motion sensor switch senses a change in detected conditions, and also to control the motion sensor switch to maintain the first or second output condition, as desired, regardless of the detected conditions.

These and other objects of the invention are substantially achieved by providing an apparatus and method for controlling a motion sensor switch capable of detecting the presence of an object of interest within a monitored area by detecting a change in condition of the monitored area, and providing a first or second output condition in response to the detection result. The apparatus and method employs a setting adjustment device, such as a potentiometer, having a setting range which sets the duration of a delay period during which the motion sensor switch delays switching from the first output condition to the second output condition after sensing a change in condition of the monitored area, and a setting position at which the setting adjustment device outputs a first bypass signal. The apparatus and method further employs a bypass controller, such as a comparator circuit or software-implemented comparator, which, in response to the first bypass signal, controls the motion sensor switch to output the first or second output condition, irrespective of the detection result.

The setting adjustment device can further include another setting at which the setting adjustment device outputs a second bypass signal. The bypass controller can s therefore control the motion sensor switch to output the first output condition in response to the first bypass signal, and to output the second output condition in response to the second bypass signal.

BRIEF DESCRIPTION OF THE DRAWINGS

These and other objects, advantages and novel features of the invention will be more readily appreciated from the following detail description when read in conjunction with the accompanying drawings, in which.

DETAILED DESCRIPTION OF THE PREFERRED EMBODIMENTS

Figure 1A:
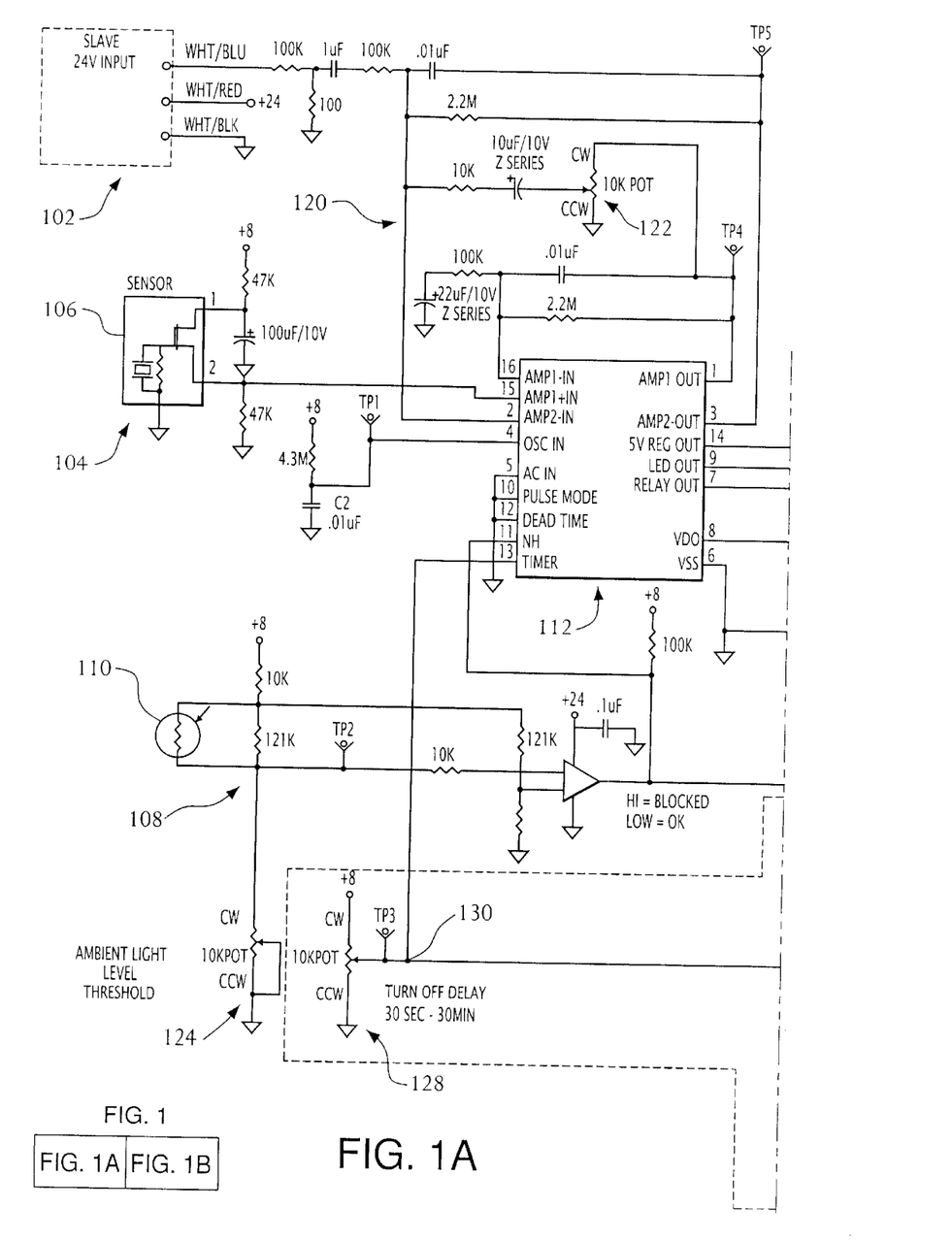
FIG. 1 is a schematic circuit diagram of a motion sensor switch employing an apparatus according to an embodiment of the present invention for providing an adjustment device of the motion sensor switch with bypass functionality.
Figure 1B:
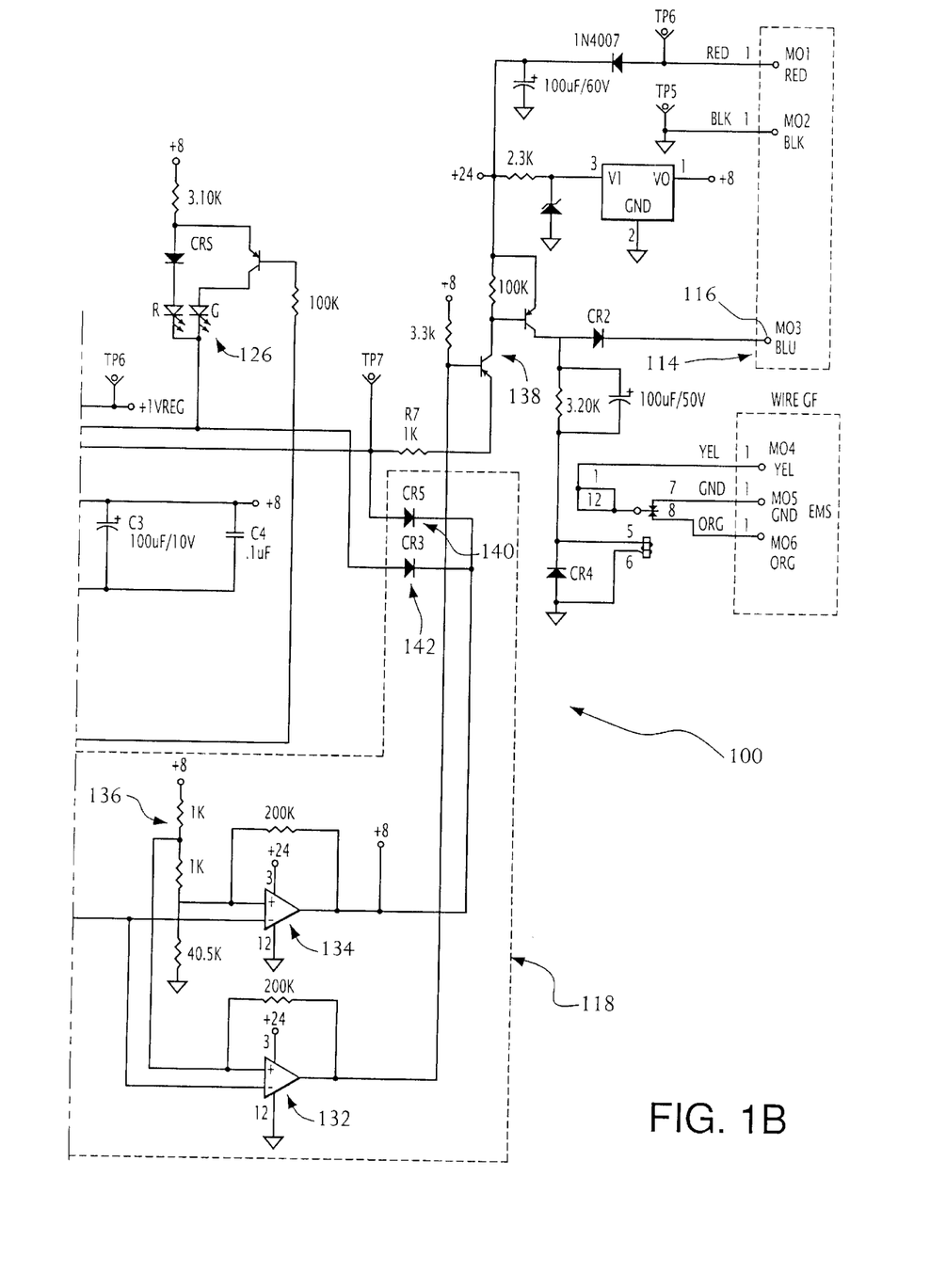

FIG. 1 is a schematic diagram of a motion sensor switch 100 employing an embodiment of the present invention. As shown, the motion sensor switch 100 includes a power circuit 102 which provides an input voltage for powering the motion sensor switch 100, a motion sensor circuit 104 which includes a motion sensor 106, such as a passive infrared detector (PIR), and an ambient light level sensor circuit 108, which includes, for example, a photocell 110.

The motion sensor switch 100 further includes a controller 112, such as a microprocessor, which receives input signals from the motion sensor circuit 104 and ambient light level sensor circuit 108, and an output circuit 114 having an output terminal 116 at which the motion sensor switch 100 provides an output voltage to a load, such as a relay for controlling a lighting circuit, or any other suitable circuit. Additionally, the motion sensor switch 100 includes a time delay and bypass circuit 118 according to an embodiment of the present invention, for controlling the manner in which the motion sensor switch 100 provides the output voltage at the output terminal 116 of the output circuit 114 as described in detail below. It is to be understood that the bypass function can be implemented in conjunction with an adjustment device other than a timing adjustment device 128.

As discussed in the background section above, the motion sensor 106 detects for changes in infrared energy radiating from regions of a monitored area, such as an office, conference room in a building, or a home, to detect for the presence of an object of interest, such as a person. The motion sensor switch 100 includes a sensitivity adjustment circuit 120, including an adjustable device 122 such as a potentiometer or the like, that can be adjusted to control the sensitivity at which the controller 112 responds to signals provided by the motion sensor circuit 106 as can be appreciated by one skilled in the art. Specifically, sensitivity adjustment circuit 120 can be adjusted to set a reference input to the controller 112 to which the controller compares the signal provided from the motion sensor circuit 106 to determine whether the signal indicates that the detected motion is sufficient to warrant action by the controller 112.

The ambient light level sensor 110 detects the level of ambient light in the monitored area, and in response, the ambient light level sensor circuit 108 outputs a signal indicating whether the ambient light level is above or below a threshold level. An ambient light threshold level adjusting device 124, such as a potentiometer or the like, can be adjusted to set the threshold level as can be appreciated by one skilled in the art.

Figures 3, 3A:
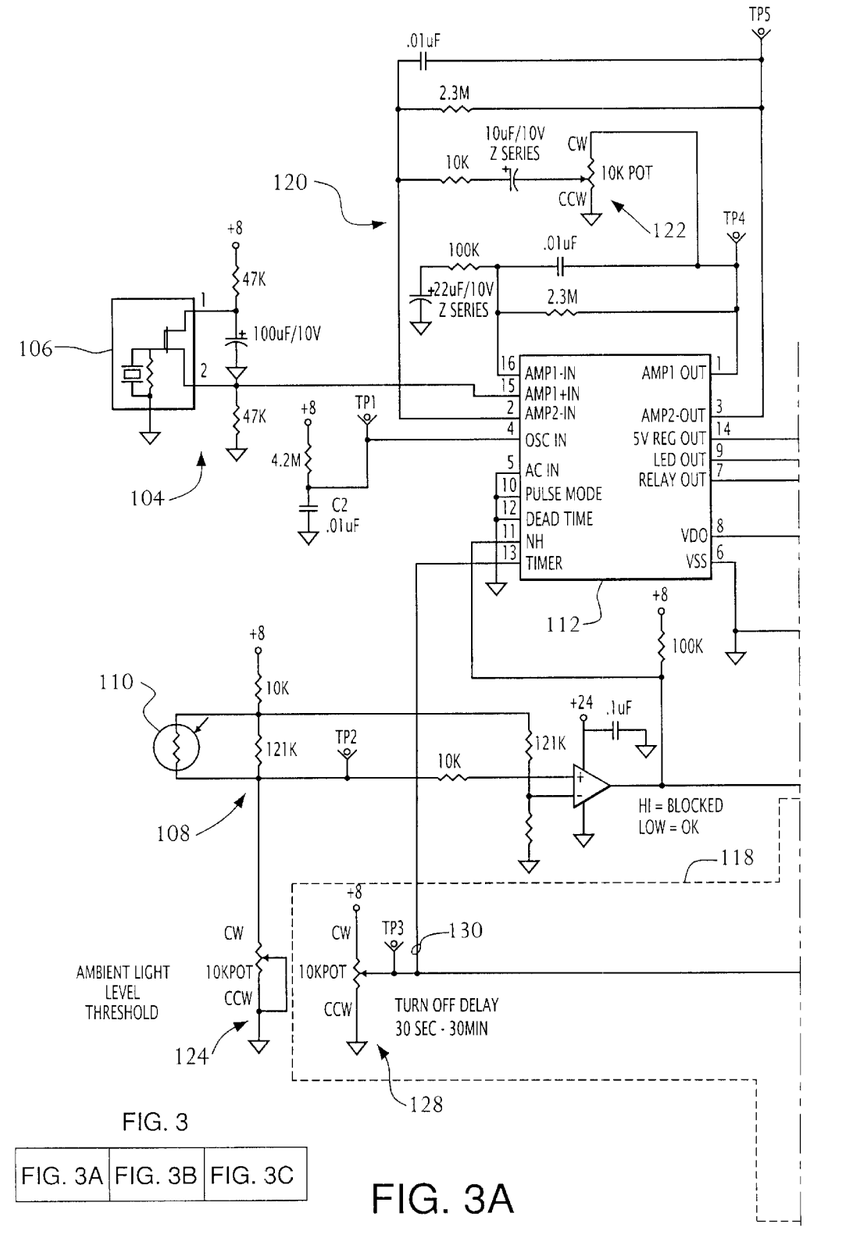
FIGS. 3A and 3B are schematic circuit diagrams of a motion sensor switch employing an apparatus according to an embodiment of the present invention for providing the time delay setting adjustment device of the motion sensor switch with bypass functionality.
Figure 3B:
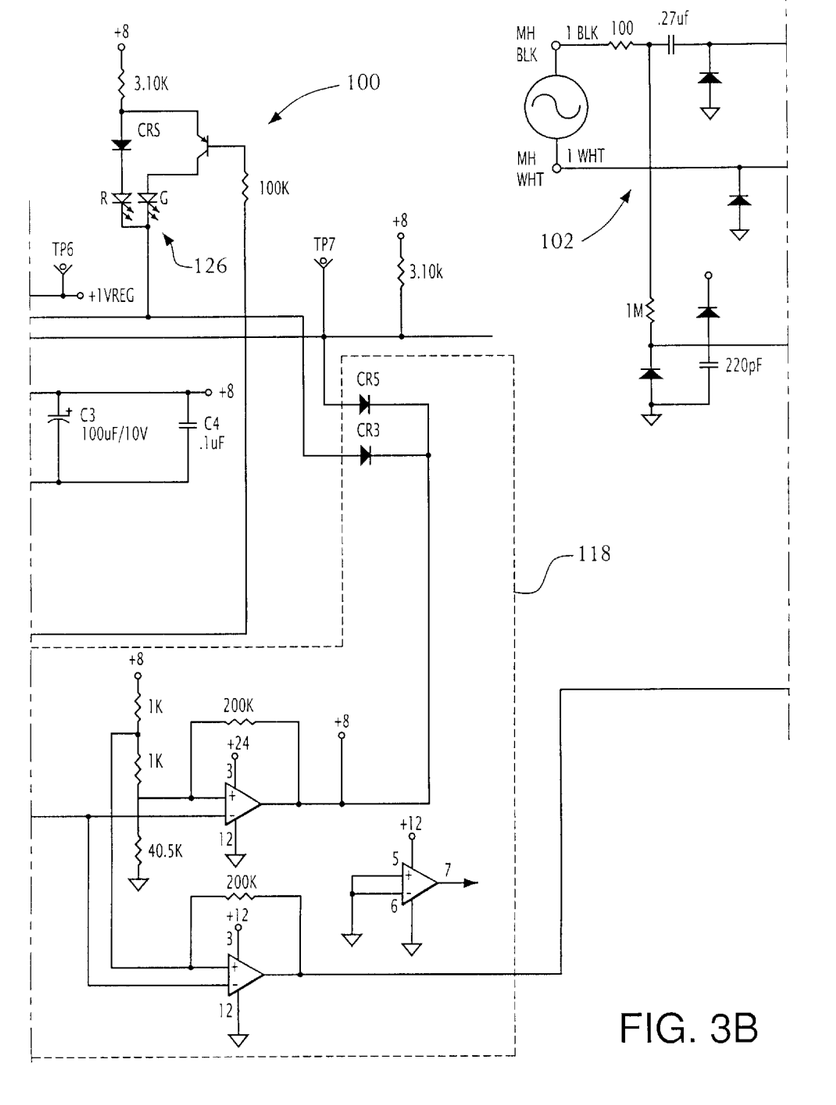
Figure 3C:
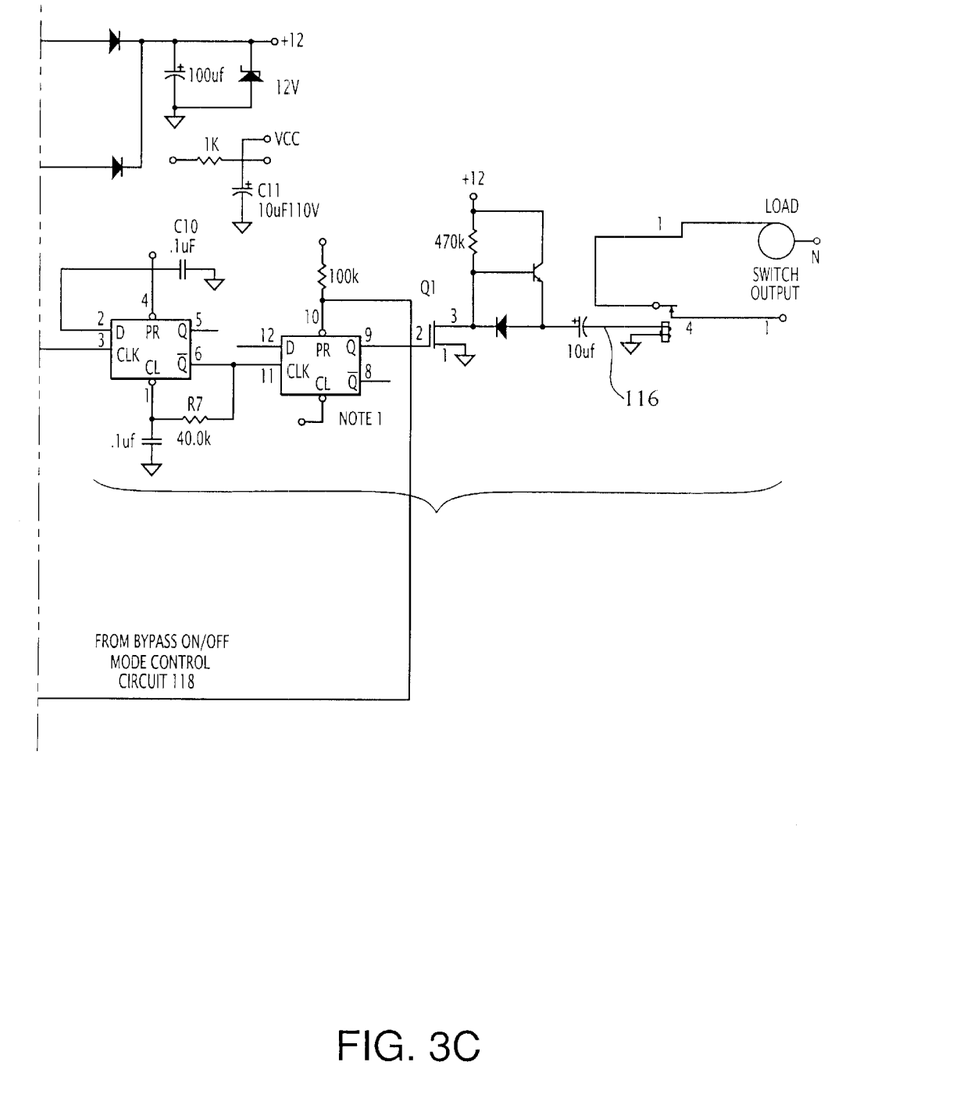

As long as the monitored area remains vacant, the motion sensor circuit 104 outputs a signal to the controller 112 indicative of this condition. The controller 112 interprets this signal as an indication that the monitored area is vacant, and outputs an appropriate signal to the output circuit 114. For purposes of this explanation, the output circuit 114 controls a relay of a lighting circuit (not shown) which activates or deactivates lights servicing the monitored area. The output circuit 114 can also have any other suitable configuration, such as the output circuit 114 depicted in FIGS. 3A and 3B and described in related U.S. patent application entitled "Bi-Color Indicator Lamp for Room Occupancy Sensor" (Attorney Docket No. 38413), cited above.

As described in more detail below, if the motion sensor switch 100 is not set to a bypass mode, the signal output by the controller 112 drives the output circuit 114 to output a signal at output terminal 116 to control the relay of the lighting circuit to maintain the lights in the monitored area in an inactive or "off" state. When a person enters the monitored area, the motion sensor 106 detects the change in infrared energy being emitted from the monitored area due to the presence of the person, and the motion sensor circuit 104 changes the status of the signal being output to the controller 112. The controller 112 interprets this change in status as an indication that the monitored area has become occupied. The controller 112 then interprets the signal provided by the ambient light level sensor circuit 108 to determine whether it is appropriate to turn on the lights servicing the monitored area.

If the motion sensor switch 100 is not operating in a bypass mode which is described in more detail below, the signal output by the controller 112 based on the interpretation of the signals provided by motion sensor circuit 104 and ambient light level sensor circuit 108 controls the output that the output circuit 114 provides at output terminal 116. That is, if the signal provided by ambient light level sensor circuit 108 indicates that the ambient light in the monitored area is sufficient (e.g., due to sunlight, etc.) and motion has been detected, the controller 112 drives the output circuit 114 to output a signal at output terminal 116 to control the relay of the lighting circuit to maintain the lights in the monitored area in an inactive or "off" state. However, if the signal provided by ambient light level sensor circuit 108 indicates that the ambient light in the monitored area is insufficient and motion has been detected, the controller 112 drives the output circuit 114 to output a signal at output terminal 116 to control the relay of the lighting circuit to activate or "turn on" the lights in the monitored area. As described in the related a U.S. patent application by Thomas S. Nishihira and David A. Blau entitled "Bi-Color Indicator Lamp for Room Occupancy Sensor" (Attorney Docket No. 38413), cited above, the motion sensor switch 100 also includes an LED indicator circuit 126 which indicates whether the ambient light conditions are sufficient or insufficient, whether motion has or has not been detected, and whether the motion sensor switch 100 is operating in normal or bypass mode.

As stated above, the motion sensor switch 100 also includes a time delay and bypass circuit 118 for adjusting the time delay of the motion sensor switch 100, and for setting the motion sensor switch in a "bypass on" or "bypass off" mode as will now be described. The time delay and bypass circuit 118 includes a timing adjustment device 128, such as a potentiometer, which can be manually adjusted to set the delay time during which the lights servicing the monitored area should remain on after all occupants have left the monitored area.

Figure 2:
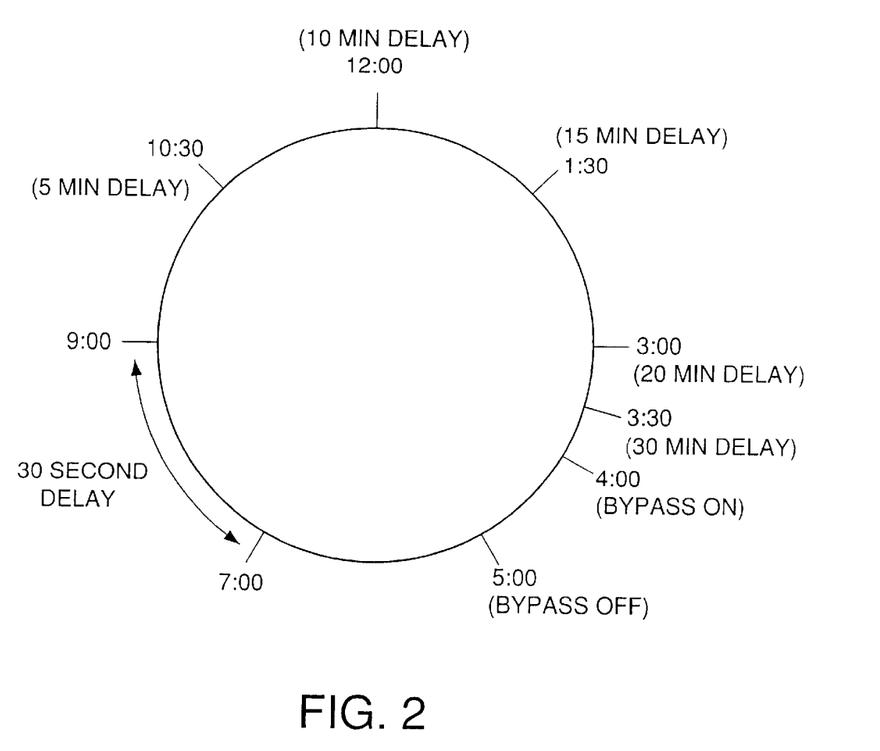
FIG. 2 is a diagram illustrating exemplary setting positions of a time delay adjustment device switch included in the apparatus shown in FIG. 1, for controlling time delay operations and bypass operations of the motion sensor switch in accordance with an embodiment of the present invention.

FIG. 2 is a diagram illustrating exemplary setting positions of the timing adjustment device 128 for setting different delay times, as well as the "bypass on" and "bypass off" settings for the motion sensor switch 100. The setting positions can be compared to the hours on the face of a clock. In this example, the 30-second delay setting is any position between approximately the 7:00 o'clock position and approximately the 9:00 o'clock position. The 5-minute delay setting is at approximately the 10:30 o'clock position, the 10-minute delay setting is at approximately the 12:00 o'clock position, and the 15-minute delay setting is at approximately the 1:30 o'clock position. As further shown, the 20-minute delay setting is at approximately the 3:00 o'clock position, and the 30-minute delay setting is at approximately the 3:30 o'clock position. In addition, the "bypass on" and "bypass off" settings are at approximately the 4:00 o'clock and 5:00 o'clock positions, respectively, and are further described below.

As can be appreciated by one skilled in the art, the different settings of the timing adjustment device 128 provide respective different voltage values at timing adjustment device output 130. In this example, the voltages range from approximately zero volts to approximately +8 volts, which is the value of the D.C. voltage supply coupled to the timing adjustment device as shown in FIG. 1. The controller 112 receives and interprets these voltage values as being representative of their respective time delay indications.

For example, when the timing adjustment device 128 is adjusted to the 30-second setting, a voltage representative of that setting appears at the timing adjustment device output 130. The controller 112 of the motion sensor switch 100 interprets that voltage value to indicate that the lights are to be deactivated after a 30-second delay period once all occupants have left the monitored area. Accordingly, when the motion sensor circuit 104 indicates to the controller 112 that the monitored area has become vacant, the controller 112 will delay for 30-seconds before driving the output circuit 114 to output a signal at output terminal 116 to control the relay of the lighting circuit to deactivate or "turn off" the lights in the monitored area. Naturally, if a person enters the monitored area during that 30-second delay period, the person is detected by the motion sensor 106, and the controller 112 ceases the delay counting and maintains the lights on while the person is in the room (assuming that the ambient light condition requires the lights to be on). Similar time delay processing is performed by the controller 112 for the other time delay settings.

On the contrary, the "bypass on" and "bypass off" settings of the timing adjustment device 128 causes the time delay and bypass circuit 118 to override the controller 112 and drive the output circuit 114 in accordance with the bypass setting. That is, if the timing adjustment device 128 is set to the "bypass on" setting, the time delay and bypass circuit 118 drives the output circuit 114 to output a signal at output terminal 116 to control the relay of the lighting circuit to maintain the lights in the monitored area in an active or "on" state, regardless of the detection by motion sensor 106 and ambient light sensor 110. Similarly, if the timing adjustment device 128 is set to the "bypass off" setting, the time delay and bypass circuit 118 drives the output circuit 114 to output a signal at output terminal 116 to control the relay of the lighting circuit to maintain the lights in the monitored area in an inactive or "off" state, regardless of the detection by motion sensor 106 and ambient light sensor 110. Details of the time delay and bypass circuit 118 will now be described.

As shown in FIG. 1, the time delay and bypass circuit 118 according to this example includes a first comparator 132 and a second comparator 134, the negative input terminals of each being coupled to the timing adjustment device output 130. The time delay and bypass circuit 118 further includes a voltage divider circuit 136, which includes two includes 1 kΩ resistors and one 49.9 kΩ resistor coupled in series between a +8 volt D.C. power supply and ground. The positive input terminal of first comparator 132 is connected to the connection point between the two 1 kΩ resistors, and the positive input terminal of second comparator 134 is connected to the connection point between the 1 kΩ and 49.9 kΩ resistors. Accordingly, the voltage being input to the positive terminal of the first comparator 132 from the +8 volt D.C. power supply is slightly higher than the voltage being input to the positive terminal of the second comparator 134.

Each of the first and second comparators 132 and 134 further has a 200 kΩ resistor shunted from its positive input terminal to its output terminal. Also, a 49.9 kΩ resistor is coupled in series between the output terminal of the second comparator 134 and a +8 volt D.C. power supply.

The output terminal of first comparator 132 is further coupled to the base of transistor 138 of output circuit 114 for purposes described in detail below. The output terminal of second comparator 134 is further coupled to the cathodes of diodes 140 and 142. The anode of diode 140 is coupled to the emitter of transistor 138 via a 1 kΩ resistor, and the anode of diode 142 is coupled to the cathodes of the LEDs of LED circuit 126, as well as to the LED circuit control output of controller 112, as described in more detail in related U.S. patent application entitled "Bi-Color Indicator Lamp for Room Occupancy Sensor" (Attorney Docket No. 38413) cited above.

The affect that the "bypass on" and "bypass off" settings of the timing adjustment device 128 have on the time delay and bypass circuit 118 will now be described. When the timing adjustment device 128 is set to the "bypass off" setting, the resistance of the timing adjustment device 128 will cause a voltage to appear at timing adjustment device 130 which is greater than each of the voltages being applied to the positive terminals of the first and second comparators 132 and 134.

Accordingly, as can be appreciated by one skilled in the art, each of the comparators 132 and 134 output a negative (low) output voltage at their respective output terminals. The negative output voltage at the output terminal of comparator 132 is applied to the base of transistor 138, which places transistor 138 in an inactive state. Placing transistor 138 in an inactive state causes output circuit 114 to provide a zero (low) voltage at output terminal 116. This low output voltage controls the relay of the lighting circuit to place the lights in an inactive or off state. As can be further appreciated by one skilled in the art, because transistor 138 is in an inactive state, the output of the controller 112 which is supplied to the emitter of transistor 138 does not influence the output at output terminal 116. Hence, the output at output terminal 116 will remain low as long as the timing adjustment device 128 is set at the "bypass off" setting, regardless of the output of the controller 112 which, as described above, is controlled by motion sensor circuit 104 and ambient light sensor circuit 108.

When the timing adjustment device 128 is set to the "bypass on" setting, the resistance of the timing adjustment device 128 will cause a voltage to appear at timing adjustment device output 130 which is less than the voltage being applied to the positive terminal of the first comparator 132, but still greater than the voltage being applied to the positive terminal of second comparator 134. As can be appreciated by one skilled in the art, comparator 132 will therefore output a positive (high) voltage at its output terminal, while comparator 134 will continue to output a negative (low) output voltage at its output terminal.

The positive output voltage at the output terminal of comparator 132 is applied to the base of transistor 138, which places transistor 138 in an active state. Placing transistor 138 in an active state causes output circuit 114 to be driven by the voltage being applied to the emitter of transistor 138. However, as can further be appreciated by one skilled in the art, the low voltage applied by the output of comparator 134 to the cathode of diode 140 maintains a low voltage at the emitter of transistor 138, regardless of the output signal applied to the emitter by controller 112.

Applying a low voltage to the emitter of transistor 138 causes output circuit 114 to provide a high voltage at output terminal 116. This high output voltage controls the relay of the lighting circuit to place the lights in an active or on state. Also, as stated above, the low voltage applied to the cathode of diode 140 prevents the output of the controller 112 from influencing the output at output terminal 116. Hence, the output at output terminal 116 will remain high as long as the timing adjustment device 128 is set at the "bypass on" setting, regardless of the output of the controller 112 which, as described above, is controlled by motion sensor circuit 104 and ambient light sensor circuit 108.

When the timing adjustment device 128 is moved further counterclockwise beyond the "bypass on" setting and thus into the time delay setting range, the resistance of the timing adjustment device 128 will cause a voltage to appear at timing adjustment device 130 which is less than each of the voltages being applied to the positive terminals of the first and second comparators 132 and 134. As can be appreciated by one skilled in the art, comparators 132 and 134 will therefore each output a positive (high) voltage at their respective output.

The positive output voltage at the output terminal of comparator 132 is applied to the base of transistor 138, which places transistor 138 in an active state. Placing transistor 138 in an active state causes output circuit 114 to be driven by the voltage being applied to the emitter of transistor 138. Also, as can further be appreciated by one skilled in the art, the high voltage applied by the output of comparator 134 to the cathode of diode 140 essentially prevents the diode from influencing the output of controller 112 being applied to the emitter of transistor 138. Accordingly, the output of controller 112 will drive the output circuit 114 to provide the appropriate voltage at output terminal 116 to control the relay of the lighting circuit to place the lights in an inactive or active state as appropriate in the manner discussed above.

As can be appreciated from the above, the bypass circuit 118 can be configured to bypass the operation of the controller 112 to control the output of a motion sensor switch 100 having any type of output circuit, such as the output circuit described in copending U.S. patent application of Thomas S. Nishihira and David A. Blau entitled "Apparatus and Method for Limiting Leakage to Ground Current While Optimizing Output of a Power Supply Adaptable for Use with a Motion Sensor Switch" (Attorney Docket No. 38423), or described in copending U.S. patent application of Thomas S. Nishihira and David A. Blau entitled "Bi-Color Indicator Lamp for Room Occupancy Sensor" (Attorney Docket No. 38413), cited above. Also, the bypass circuit 118 need not provide both bypass on and bypass off operations, but can be configured to provide one or the other.

For instance, if the second comparator 134 and associated circuitry, including diodes 140 and 142 are removed, the first comparator 132 and related circuitry of bypass circuit 118 will provide only bypass off functionality as can be appreciated from the above. On the contrary, if the first comparator 132 and associated circuitry are removed, and the base of transistor 138 is maintained high, the second comparator 132 and related circuitry of bypass circuit 118 will provide only bypass on functionality as can be appreciated from the above.

Also, the bypass circuit 118 need not be implemented as a hardware circuit. The output 130 of timing adjustment device 128 can be provided to controller 112, which can be programmed to perform the timing delay operations as described above, as well as bypass on, bypass off, or both. For example, the controller 112 can be programmed to enter the bypass on mode when the voltage level at output 130 is above the highest timing delay voltage level, but not as high as the bypass off voltage level. In this event, the controller 112 outputs a signal to output circuit 114 to cause output circuit 114 to provide an output signal 116 which controls the relay of the lighting circuit to place the lights in an active or on state, regardless of the signals provided by the motion sensor circuit 104 and ambient light sensor circuit 108.

The controller 112 can be also programmed to enter the bypass off mode when the voltage level at output 130 is above the bypass on voltage level. In this event, the controller 112 outputs a signal to output circuit 114 to cause output circuit 114 to provide an output signal 116 which controls the relay of the lighting circuit to place the lights in an inactive or off state, regardless of the signals provided by the motion sensor circuit 104 and ambient light sensor circuit 108.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. An apparatus for controlling a sensor switch which is adapted to sense a condition of a monitored area, said apparatus comprising:

a setting adjustment device, having a setting range adapted to set a parameter, and a setting position at which said setting adjustment device is adapted to output a first bypass signal, said parameter selected from the group consisting of the duration of a delay period during which said sensor switch delays switching from a first output condition to a second output condition after sensing a change in condition of the monitored area, and the sensitivity level at which a detector connected to said setting adjustment device operates; and a bypass controller, adapted to control said sensor switch in response to said first bypass signal to maintain said first output condition or said second output condition, irrespective of detection of said change in condition by said sensor switch.

2. An apparatus as claimed in claim 1, wherein:
said bypass controller is adapted to control said sensor switch to maintain said first output condition in response to said first bypass signal.

3. An apparatus as claimed in claim 1, wherein:
said bypass controller is adapted to control said sensor switch to maintain said second output condition in response to said first bypass signal.

4. An apparatus as claimed in claim 1, wherein:
said setting adjustment device comprises a potentiometer, with said setting range being a setting range of said potentiometer and said setting position being a setting position of said potentiometer.

5. An apparatus as claimed in claim 4, wherein:
said potentiometer includes a ground terminal, such that a first resistance between any setting within said setting range and said ground terminal is less than a second resistance between said setting position and said ground terminal.

6. An apparatus as claimed in claim 1, wherein:
said bypass controller comprises a comparator, adapted to compare an output of said setting adjustment device to a first predetermined signal to determine whether said output represents said first bypass signal.

7. An apparatus as claimed in claim 1, wherein:
said setting adjustment device further comprises a second setting position at which said setting adjustment device is adapted to output a second bypass signal;

said bypass controller is adapted to control said sensor switch to maintain said first output condition in response to said first bypass signal, and is adapted to control said sensor switch to maintain said second output condition in response to said second bypass signal.

8. An apparatus as claimed in claim 7, wherein:
said bypass controller comprises a comparator, adapted to compare an output of said setting adjustment device to a first predetermined signal to determine whether said output represents said first bypass signal or said second bypass signal.

9. A method for controlling a sensor switch which is adapted to sense a condition of a monitored area, said method comprising the steps of:

monitoring a setting of a setting adjustment device of said sensor switch, said setting adjustment device having a setting range, adapted to set a duration of a delay period during which said sensor switch delays switching from a first output condition to a second output condition after sensing a change in condition of the monitored area, and a first bypass setting position; and when said monitoring step determines that said setting adjustment device is set to said first bypass setting position, controlling said sensor switch to maintain said first output condition or said second output condition, irrespective of detection of said change in condition of said monitored area.

10. A method as claimed in claim 9, wherein:
said controlling step controls said sensor switch to maintain said first output condition when said setting adjustment device is set to said first bypass setting position.

11. A method as claimed in claim 9, wherein:
said controlling step controls said sensor switch to maintain said second output condition when said setting adjustment device is set to said first bypass setting position.

12. A method as claimed in claim 9, wherein:
said monitoring step comprises a step of comparing an output of said setting adjustment device to a first predetermined signal to determine whether said setting adjustment device is set to said first bypass setting position.

13. A method as claimed in claim 9, wherein:
said setting adjustment device further comprises a second bypass setting position;

said monitoring step includes monitoring said setting adjustment device to determine whether said setting adjustment device is set to said second bypass setting position;

when said monitoring step determines that said setting adjustment device is set to said first bypass setting position, said controlling step controls said sensor switch to maintain said first output condition; and when said monitoring step determines that said setting adjustment device is set to said second bypass setting position, said controlling step controls said sensor switch to maintain said second output condition.

14. A method as claimed in claim 13, wherein:
said monitoring step comprises a step of comparing an output of said setting adjustment device to a first predetermined signal to determine whether said setting adjustment device is set to said first bypass setting position or said second bypass setting position.

15. A method of controlling a sensor switch to control a lighting circuit of a monitored area, said sensor switch including a first sensor adapted to sense a condition of said monitored area, and a setting adjustment device having a delay setting range and a first bypass setting, said method comprising the steps of:

monitoring a setting of said setting adjustment device; and when said setting adjustment device is set to said first bypass condition, controlling said sensor switch to maintain said lighting circuit activated or deactivated irrespective of a sensing of a change in said condition by said first sensor.

16. A method as claimed in claim 15, wherein:

when said setting adjustment device is set to said first bypass condition, said controlling step controls said sensor switch to maintain said lighting circuit activated irrespective of a sensing of a change in said condition by said first sensor.

17. A method as claimed in claim 15, wherein:

when said setting adjustment device is set to said first bypass condition, said controlling step controls said sensor switch to maintain said lighting circuit deactivated irrespective of a sensing of a change in said condition by said first sensor.

18. A method as claimed in claim 15, wherein:

said setting adjustment device includes a second bypass condition;

when said setting adjustment device is set to said first bypass condition, said controlling step controls said sensor switch to maintain said lighting circuit activated irrespective of sensing of a change in said condition by said first sensor; and when said setting adjustment device is set to said second bypass condition, said controlling step controls said sensor switch to maintain said lighting circuit deactivated irrespective of sensing of a change in said condition by said first sensor.

19. A method as claimed in claim 15, further comprising the step of:

when said setting adjustment device is set to a delay indication in said delay setting range, said sensor switch is controlling said lighting circuit to be activated, and said first sensor senses a change in said first condition of said monitored area, controlling said sensor to deactivate said lighting circuit after a delay period designated by said delay indication.

20. A method as claimed in claim 15, wherein:

said sensor switch includes a second sensor adapted to sense a second condition of said monitored area; and when said setting adjustment device is set to said first bypass condition, said controlling step controls said sensor switch to maintain said lighting circuit activated or deactivated irrespective of a sensing of a change in said condition of said monitored area by said first sensor and a sensing of a change in said second condition of said monitored area by said second sensor.

* * * * *